United States Patent [19]
Kusumoto et al.

[11] Patent Number: 5,413,139
[45] Date of Patent: May 9, 1995

[54] THROTTLE VALVE

[75] Inventors: Satoru Kusumoto; Ryoichi Oka, both of Yokohama, Japan

[73] Assignee: Tylan General, K.K., Yokohama, Japan

[21] Appl. No.: 78,365

[22] Filed: Jun. 16, 1993

[30] Foreign Application Priority Data

Dec. 2, 1992 [JP] Japan .................................. 4-350321

[51] Int. Cl.⁶ .............................................. F16K 49/00
[52] U.S. Cl. ..................................... 137/341; 251/205
[58] Field of Search ................. 137/341, 315; 251/305

[56] References Cited
U.S. PATENT DOCUMENTS 2,680,449  6/1954  Toulmin, Jr. ......................... 137/341
4,715,400  12/1987  Gardner et al. ..................... 137/341
4,759,198  7/1988  Yamada ............................... 137/341

FOREIGN PATENT DOCUMENTS 837426  4/1952  Germany ............................. 137/341

Primary Examiner—A. Michael Chambers
Attorney, Agent, or Firm—Jordan and Hamburg

[57] ABSTRACT

A throttle valve is provided with a heater for keeping an external surface of a valve disc and an adjacent thereto internal surface of a flange portion at high temperature to prevent deposition of fine particles contained in etching gas, and thereby the said valve may provide smooth and reliable adjustment of the valve opening over the long period of its operation.

The valve controls the flow of gas along a pipe by changing the open area of a fluid passage formed therein through the valve disc 2 which is turned by driving shaft 3 from driving means provided in a driving portion 4. The valve disc 2 is heated with a heating rod 6 mounted therein. Plate-like heaters $20_1$ and $20_2$ are mounted on the flange portion 1b of the valve 1 to heat the flange portion 1b and valve disc 2. The external surface of the valve disc 2 and the internal surface of the flange portion are heated to prevent adhesion of dust particles thereto. Therefore, the valve disc 2 can smoothly move with no obstruction.

19 Claims, 3 Drawing Sheets

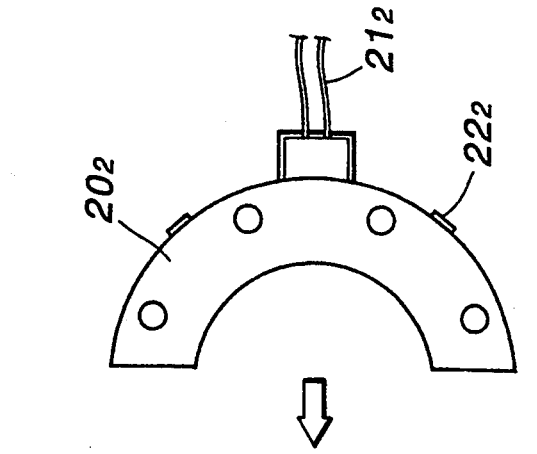
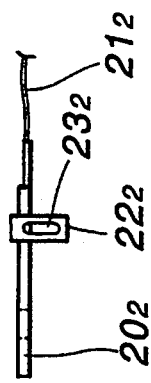
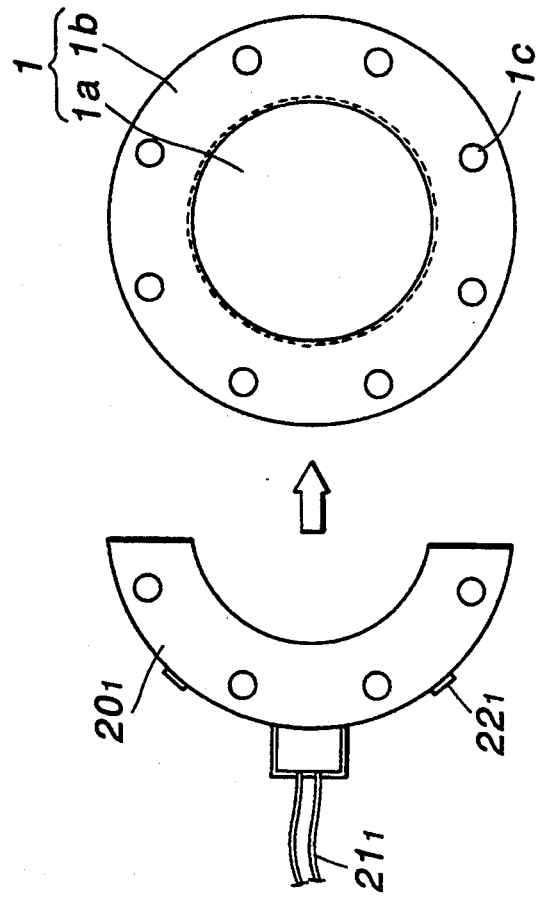
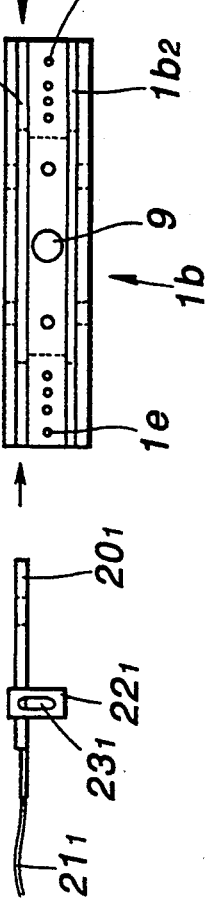

1

THROTTLE VALVE

BACKGROUND OF THE INVENTION

The present invention relates to a motor-driven throttle valve which is utilized to regulate the rate of flow of reactive gas for dry etching or C V D (Chemical Vapour Deposition) in semiconductor manufacturing process.

Dry etching or C V D in the semiconductor manufacturing process is carried out in such a way that a silicone wafer is placed in a chamber connected with a system for feeding reactive gas and subjected to react with said gas that is supplied by a supplying system and sucked out by a vacuum pump through a throttle valve. The flow rate of the reactive gas is controlled by the throttle valve according to a desired reaction rate.

However, any conventional throttle valve may suffer sticking of fine particles contained in the reactive gas to an external surface of a valve disc and an internal surface of a valve disc supporting flange and the accumulation of the particles makes it difficult to adequately adjust the valve opening and, in the worst case, makes it impossible to open and close the valve. To prevent this, it is needed to periodically disassemble the valve and carry out cleaning of external and internal surfaces of the valve disc and flange. This is laborious and time-consuming. Furthermore, reactive gases are usually toxic and hazardous to treat.

SUMMARY OF THE INVENTION

Accordingly, it is the primary object of the present invention to provide a throttle valve which can provide smooth and reliable adjustment of its opening over a long period of operation with reactive gases.

Another object of the present invention is to provide a throttle valve which is capable of reliably adjusting its opening for a long period of operation with reactive gas by keeping an external surface of a valve disc and an internal surface of a flange portion adjacent to the valve disc external surface at a high temperature to prevent particles contained in etching gas from sticking thereto.

A further object of the present invention is to provide a throttle valve which comprises a valve body having a flange portion surrounding a fluid passage and a valve disc having a diameter being substantially equal to that of the fluid passage and a rotation axis being perpendicular to that of the fluid passage and being rotatably mounted in the flange portion, characterized in that a plate-like heater having electric heating elements arranged thereon is removably mounted in an annular groove formed on the flange portion.

BRIEF DESCRIPTION OF DRAWINGS

FIGS. 3(a)-(c') are disassembled views for explaining a throttle valve embodying the present invention.

DESCRIPTION OF THE PREFERRED EMBODIMENTS

Figure 1:
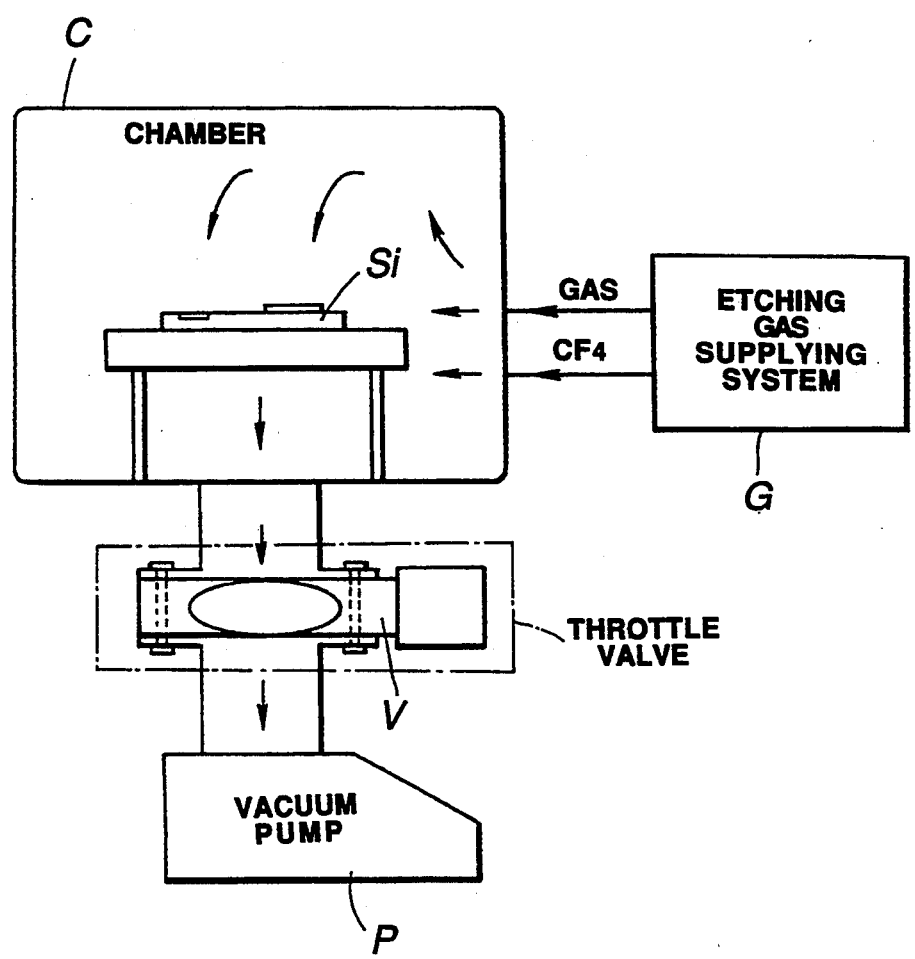
FIG. 1 is a view for explaining a preferred example of an application of a throttle valve according to the present invention.

FIG. 1 schematically shows a preferred example of an application of a throttle valve according to the present invention.

As shown in FIG. 1, a dry etching process for production of semiconductors is carried out in such ways that a silicone wafer Si is placed in a chamber C and subjected to etching with etching gas, e.g., CF4 (carbon tetrafluoride) being supplied thereto from an etching gas supplying system G and being simultaneously sucked therefrom by a vacuum pump P through a throttle valve V. In this case, the flow rate of the etching gas is adjusted by opening the throttle valve so as to attain a desired reaction rate on the silicone wafer.

However, in application of any conventional throttle valve, there arises such a problem that fine particles contained in the etching gas deposit and accumulate on an external surface of a valve disc and an internal surface of a flange portion for supporting the valve disc, causing obstruction of adequate adjustment of the valve opening and in the worst case resulting in impossibility of its operation. To avoid such trouble, it is needed to periodically disassemble the valve and carry out cleaning of the external surface of the valve disc and the internal surface of the flange. This is laborious and time-consuming. Furthermore, etching gases are usually toxic and hazardous to treat.

Figure 2:
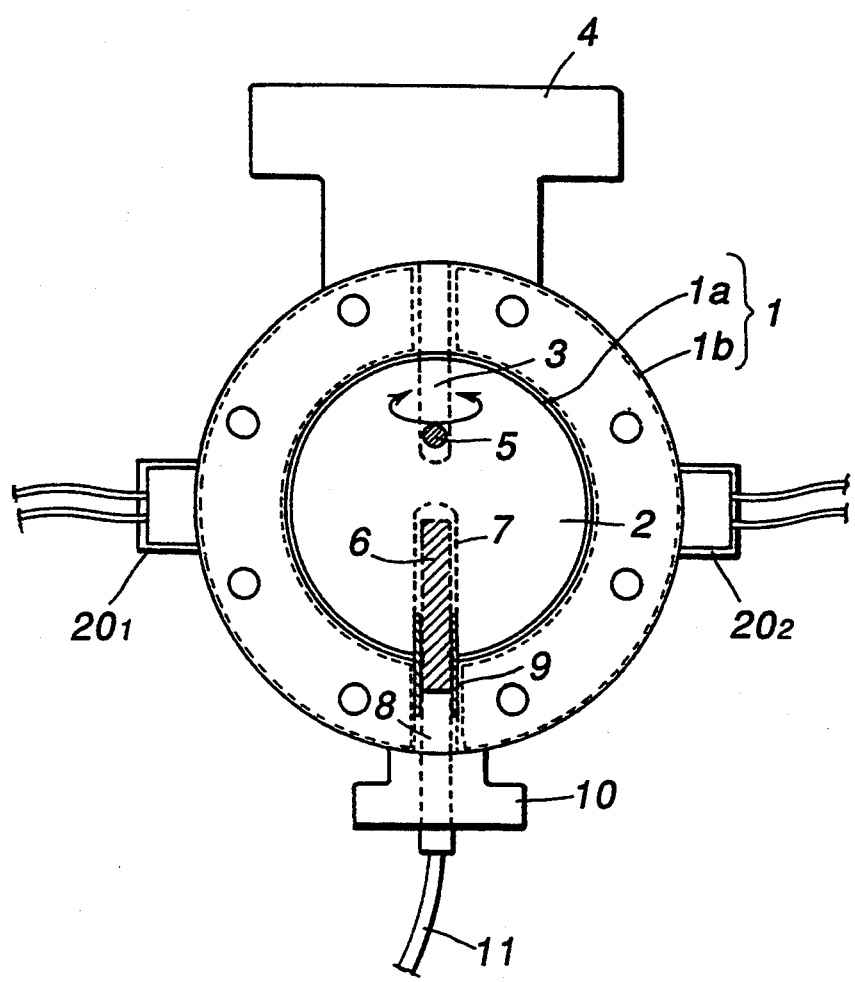
FIG. 2 is a front view, partly in cross section, of a throttle valve embodying the present invention.

FIG. 2 is a view for explaining a throttle valve embodying the present invention. In FIG. 2, numeral 1 designates a throttle valve body 1 having a flange portion 1b surrounding a fluid passage 1a and numeral 2 designates a valve disc which has a diameter substantially equal to the diameter of the fluid passage 1a and is rotatably mounted in the fluid passage portion 1a of the valve body 1. A driving shaft 3 connecting the valve disc 2 to a valve driving portion 4 is integrally secured by a pin 5 to the valve disc 2. The driving portion 4 through its driving means effects the driving shaft 3 to turn the valve disc 2 for varying the opening area of the fluid passage 1a.

A cylindrical heating rod 6 is inserted at its front heating end in a blind hole 7 made in the rotating axis portion of the valve disc 2 and is secured at its rear end to the flange portion 1b of the valve body. A tubular collar member 9 is inserted into the blind hole 7 through a through hole 8 made in the flange portion 1b of the valve body 1 and rotatably supports the valve disc and prevents the rotation axis of the valve disc from shifting. Numeral 10 designates a fixing member for fixing the heater rod to the valve body 1 and numeral 11 designates a lead wire of the heater rod 6.

The foregoing description concerns an example of the throttle valve having the heating rod 6 in its valve disc 2. Such provision may heat the valve disc to prevent dust from sticking thereto, eliminating the possibility of irregular operation of the valve disc. For convenience of explanation, the throttle valve provided with means for heating the valve disc is first exemplified, but it may be supplementary means to solve the problem. A throttle valve provided with a heater in its flange portion is more practical to use because the heater may have larger heating power and be simpler in design and easy to mount and remove.

FIGS. 3(a), 3(b), 3(c), 3(a'), 3(b'), 3(C') show a disassembled throttle valve provided with a heater in its flange portion according to the present invention. FIGS. 3 (a), (b) and (c) are plan views and FIGS. 3(a'), (b') and (c') are side views. A valve body 1 has a flange portion 1b surrounding a fluid passage 1a, which has bolt holes 1c provided therein for flange coupling and by which the valve is mounted in fluid piping to form a part of fluid passage of the piping as shown in FIG. 2.

At the side surface of the flange portion $1b$ there are formed an annular groove $1b_1$ (and $1b_2$ if needed) wherein semicircular ring-shaped plate heaters $20_1$ and $20_2$ are removably mounted. These plate heaters have through holes corresponding to bolt holes $1c$ in the flange portion $1b$. Therefore, the flange portion $1b$ together with the plate heaters $20_1$ and $20_2$ inserted in the annular groove $1b_x$ or $1b_2$ thereof is mounted in the piping by a flange coupling.

The plate heaters $20_1$ and $20_2$ are provided with lead wires $21_1$ and $21_2$ respectively and have tabs $22_1$ and $22_2$, respectively, which are secured with screws to the flange portion $1b$, utilizing screw holes $23_1$ and $23_2$ made therein and screw holes $1e$ made in the flange portion $1b$. The plate heaters are thus united to the flange portion of the throttle valve so as not to slip off therefrom during transportation and operation of the valve.

As is apparent from the foregoing description, the throttle valve according to the present invention is constructed in such a way that its flange portion may be heated by plate heaters removably mounted therein to the extent to prevent the deposition of dust and particles onto the internal surface of the flange portion and adjacent thereto. Furthermore, the flange construction makes it possible to increase the capacity of applicable heaters, thereby the heat from the flange portion may be easily transferred to the valve disc to prevent the deposition of particles onto the external surface of the valve disc and the adjacent portion thereof.

Consequently, the throttle valve provided with heaters in its flange portion, as shown in FIGS. 3(a)–3(c'), may have sufficient heating capacity and may not require further provision of the heating rod shown in FIG. 2.

While the above-described embodiment uses semicircular ring type heaters, it is not intended that the invention be limited to the shown embodiment and will, instead, use many differently shaped heaters as well as heaters which are not united to the flange portion but removably secured thereto. The use of removable heaters may greatly lighten the maintenance work because only broken heaters can be exchanged with new ones without removing the throttle valve from the piping.

As is apparent from the foregoing, the throttle valve according to the present invention is free from deposition of fine particles, e.g., dust onto the external surface of the valve disc and the corresponding thereto internal surface of the flange portion, assuring smooth opening and closing of the valve disc and eliminating the need of frequently disassembling the valve body for internal cleaning. Owing to the above-mentioned feature the throttle valve according to the present invention is especially effective for application wherein toxic gas shall be treated. Elimination of disassembling the throttle valve for internal cleaning may not only lighten the maintenance work but also assure effective use of the whole system wherein the throttle valve is applied.

What is claimed is:

1. A throttle valve comprising:
   a main body having a flange portion enclosing a fluid passage extending in a first direction, said flange portion having an annular groove for removably mounting therein a plate-shaped heater, said annular groove being open along an outer surface of said flange portion;
   a valve disc having a diameter substantially equal to that of the fluid passage and a rotation axis perpendicular to the first direction of the fluid passage, said valve disc being rotatably mounted in the flange portion; and
   driving means for rotating the valve disc about said rotation axis.

2. A throttle valve according to claim 1, wherein the plate-shaped heater has a shape of a semicircular ring.

3. A throttle valve according to claim 1 or 2, wherein said valve disc has a blind hole extending along said rotation axis; and
   further comprising a heating rod for heating the valve disc, said heating rod being inserted in said blind hole of the valve disc.

4. A throttle valve according to claim 3, wherein said heating rod is secured at a rear end thereof to said flange portion.

5. A throttle valve according to claim 4, wherein said flange portion has a through hole in alignment with said blind hole, and said heating rod extends through said through hole.

6. A throttle valve according to claim 5, further comprising a tubular collar member inserted into said blind hole through said through hole and in surrounding relation to said heating rod, so as to rotatably support said valve disc.

7. A throttle valve according to claim 5, further comprising wire means extending through said through hole and connected with said heating rod for supplying current to said heating rod.

8. A throttle valve according to claim 1, wherein there are two said annular grooves which are parallel and spaced apart from each other along said flange portion.

9. A throttle valve comprising:
   a main body having a flange portion enclosing a fluid passage extending in a first direction, said flange portion having an annular groove for removably mounting therein a plate-shaped heater, said annular groove being open along an outer surface of said flange portion;
   a valve disc having a diameter substantially equal to that of the fluid passage and a rotation axis perpendicular to the first direction of the fluid passage, said valve disc being rotatably mounted in the flange portion;
   driving means for rotating the valve disc; and
   a plate-shaped heater removably mounted in said annular groove and removably secured to said outer surface of said flange portion.

10. A throttle valve according to claim 9, wherein the plate-shaped heater has a shape of a semicircular ring.

11. A throttle valve according to claim 9, wherein said valve disc has a blind hole extending along said rotation axis; and
    further comprising a heating rod for heating the valve disc, said heating rod being inserted in said blind hole of the valve disc.

12. A throttle valve according to claim 11, wherein said heating rod is secured at a rear end thereof to said flange portion.

13. A throttle valve according to claim 12, wherein said flange portion has a through hole in alignment with said blind hole, and said heating rod extends through said through hole.

14. A throttle valve according to claim 13, further comprising a tubular collar member inserted into said blind hole through said through hole and in surrounding relation to said heating rod, so as to rotatably support said valve disc.

15. A throttle valve according to claim 13, further comprising wire means extending through said through hole and connected with said heating rod for supplying current to said heating rod.

16. A throttle valve according to claim 9, wherein there are two said plate-shaped heaters, each having a semicircular ring configuration.

17. A throttle valve according to claim 9, wherein said outer surface has threaded holes, and said plate-shaped heater includes a tab having a hole therein for receipt of a bolt threadedly secured within one said threaded hole, so as to removably secure said plate-shaped heater to said flange portion.

18. A throttle valve according to claim 17, wherein said annular groove is offset in an axial direction of said flange portion from said threaded holes.

19. A throttle valve according to claim 9, wherein there are two said annular grooves which are parallel and spaced apart from each other along said flange portion.

* * * * *